(12) United States Patent (10) Patent No.: US 9,121,708 B1
Qiu (45) Date of Patent: Sep. 1, 2015

(54) RESONATOR FIBER OPTIC GYROSCOPE WITHOUT FREQUENCY OVERLAP IN SIDEBAND-HETERODYNE-DETECTION MODULATIONS

(71) Applicant: Honeywell International Inc., Morristown, NJ (US)

(72) Inventor: Tiequn Qiu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/272,842

(22) Filed: May 8, 2014

(51) Int. Cl.
*G01C 19/72* (2006.01)

(52) U.S. Cl.
CPC .................................... *G01C 19/727* (2013.01)

(58) Field of Classification Search
CPC ......... G01C 19/00; G01C 19/64; G01C 19/72
USPC .................................................. 356/460, 461
See application file for complete search history.

(56) References Cited

U.S. PATENT DOCUMENTS

| | | | |
|---|---|---|---|
| 5,781,300 A * | 7/1998 | Strandjord et al. | ........... 356/460 |
| 7,715,014 B2 | 5/2010 | Chen | |
| 7,864,328 B2 | 1/2011 | Strandjord | |
| 8,446,589 B2 | 5/2013 | Strandjord et al. | |
| 2005/0013385 A1 | 1/2005 | Atkinson | |
| 2014/0044142 A1 | 2/2014 | Strandjord et al. | |

FOREIGN PATENT DOCUMENTS

CN 102636187 8/2012

OTHER PUBLICATIONS

Strandjord et al., "Method and System for Detecting Optical Ring Resonator Resonance Frequencies and Free Spectral Range to Reduce the Number of Lasers in a Resonator Fiber Optic Gyroscope", "U.S. Appl. No. 13/774,678", Feb. 22, 2003, pp. 1-53, Published in: US.
Strandjord et al., "Systems and Methods Sideband Heterodyning Detection", "U.S. Appl. No. 13/916,680, filed Jun. 13, 2013", pp. 1-41, Published in: US.

(Continued)

*Primary Examiner* — Jonathan Hansen
(74) *Attorney, Agent, or Firm* — Fogg & Powers LLC (57) ABSTRACT

A resonator fiber optic gyroscope (RFOG) is provided. The RFOG includes a fiber coil, first and second lasers, first and second phase modulators, and a common phase modulator. The first laser generates CW input light for propagation in the CW direction of the fiber coil. The second laser generates CCW input light for propagation in the CCW direction of the fiber coil. The first phase modulator modulates the CW input light with modulation frequency $f_1=(n+0.5)*FSR$. The second phase modulator modulates the CCW input light with modulation frequency $f_2=(m+0.5)*FSR$ so that overlap of major sidebands is avoided. The phase modulation amplitudes of the first and second modulators substantially suppress the optical carrier components of the CW and CCW input light. The common phase modulator is configured to modulate the CW and CCW input light with a common phase modulation frequency and a common phase amplitude.

20 Claims, 5 Drawing Sheets

(56) References Cited

OTHER PUBLICATIONS

Qiu et al., "Method and Apparatus of Tracking/Locking Resonator Free Spectral Range and Its Application in Resonator Fiber Optic Gyroscope", "U.S. Appl. No. 14/047,855, filed Oct. 7, 2013", pp. 1-39, Published in: US.

Ma et al., "Double closed-loop resonator fiber optic gyro with improved digital serrodyne modulation", "Proceedings of SPIE", May 20, 2013, pp. 1-5, vol. 8794.

* cited by examiner

RESONATOR FIBER OPTIC GYROSCOPE WITHOUT FREQUENCY OVERLAP IN SIDEBAND-HETERODYNE-DETECTION MODULATIONS

BACKGROUND

Resonator fiber optic gyroscopes (RFOG) measure rotation rates by detecting the resonance frequency difference between the light propagating in the clockwise (CW) and counter-clockwise (CCW) directions of a resonator. When the rotation rate of the RFOG is small, the frequency difference is very small. In this case, the back reflected light interferes with the counter-propagating light, which causes large errors in the detection of the rotation rate.

Currently available techniques to overcome this problem use of several different resonance modes to avoid overlap of laser frequencies. Some currently available techniques require more than three lasers to subtract out free spectral range (FSR) fluctuation induced errors. Other currently available techniques use frequency switching techniques to precisely measure and subtract out the FSR. These currently available techniques add complexity and cost to the RFOG.

SUMMARY

The present application relates to a resonator fiber optic gyroscope (RFOG). The resonator fiber optic gyroscope includes a fiber coil, a first laser, a second laser, a first phase modulator, a second phase modulator, and a common phase modulator. The fiber coil forms a resonator. The first laser generates clockwise (CW) input light for propagation in the CW direction of the fiber coil. The second laser generates counter-clockwise (CCW) input light for propagation in the CCW direction of the fiber coil. The first phase modulator modulates the CW input light with a first modulation frequency of $f_1=(n+0.5)*FSR$ before being coupled into the fiber coil in the CW direction, where n is zero or a positive integer. The phase modulation amplitude of the first modulator is selected to substantially suppress the optical carrier component of the CW input light before being coupled into the fiber coil. The second phase modulator modulates the CCW input light with a second modulation frequency of $f_2=(m+0.5)*FSR$ before being coupled into the fiber coil in the CCW direction, where m is zero or a positive integer and is different from n. The integers n and m are selected to avoid overlap of major sidebands of the CW input light and the CCW input light. The phase modulation amplitude of the second modulator is selected to substantially suppress the optical carrier component of the CCW input light before being coupled into the fiber coil. The common phase modulator is configured to modulate the CW input light and the CCW input light with a common phase modulation frequency and a common phase amplitude.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below reduce the number lasers and simplify operation of an RFOG by using "carrier suppressed modulation" (CSM) to suppress the carrier of the clockwise (CW) and the counter-clockwise (CCW) optical beams. The phase modulation amplitudes are carefully selected to convert nearly all the optical carrier power to its modulation sidebands so that the carrier of each optical beam is completely suppressed. In addition to carrier suppressed modulation, the embodiments of RFOGs described herein select different modulation frequencies for the CW and CCW optical beams in order to avoid an overlap of any CW and CCW frequency components with detectable power. In this manner, two lasers with same carrier frequency for CW and CCW resonance detection are locked on to the same resonance without mutual interference. Additionally, a common modulation is applied to both the CW and CCW optical beams for a sideband-heterodyne-detection (SHD) modulation. This simplified RFOG architecture provides improved performance and reduced cost over the currently available RFOG architectures.

Figure 1:
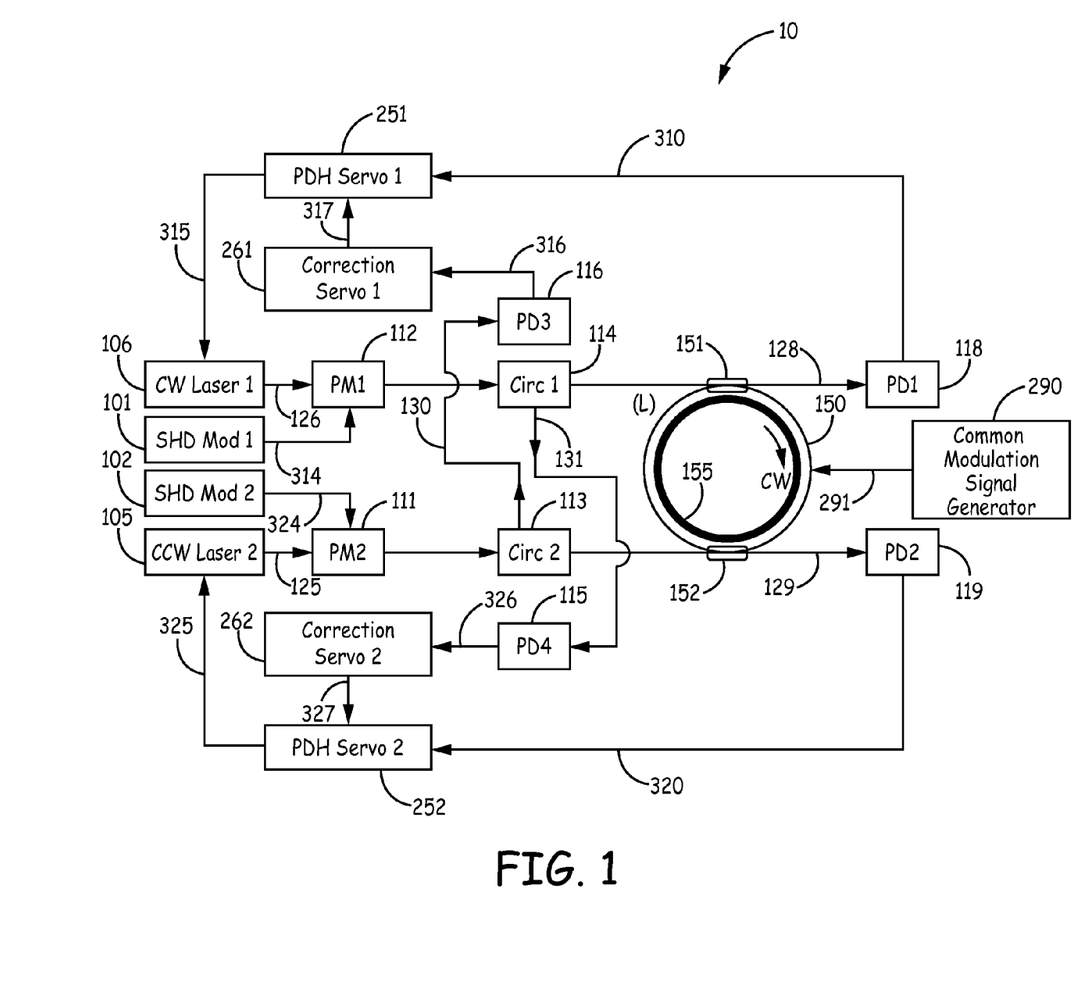
FIG. 1 is a block diagram of an embodiment of a two-laser RFOG architecture to suppress carrier frequencies and implement sideband-heterodyne-detection modulations.

FIG. 1 is a block diagram of an embodiment of a two-laser RFOG architecture to suppress carrier frequencies and implement sideband-heterodyne-detection modulations. The RFOG 10 includes a fiber coil 150, a first laser 106, a second laser 105, a first sideband-heterodyne-detection (SHD) modulation generator 101, a second sideband-heterodyne-detection (SHD) modulation generator 102, a first coupler 151, a second coupler 152, a first detector 118, a second detector 119, a third detector 116, a fourth detector 115, a first optical circulator 114, a second optical circulator 113, a first phase modulator 112, a second phase modulator 111, a common modulation signal generator 290, a piezo-electric transducer (PZT) 155, a first servo 251, a second servo 252, and a first bias correction servo 261, a second bias correction servo 262.

The sensing fiber coil 150 of the RFOG forms a resonator, which is also referred to herein as "resonator 150" and "sensing resonator 150". The resonance frequency ($f_r$) is described mathematically as follows:

$$f_r = k*c/L = k*\text{FSR} \qquad \text{Eq. (1)}$$

where k is a positive integer, L is the resonator round trip optical length, which takes into account the index of refraction of the fiber), of the resonator 150, and c is the speed of light.

The first laser 106 generates clockwise (CW) light 126 for propagation in the CW direction of the resonator 150. The first laser 106 is also referred to herein as "CW laser 106". The CW light 126 is also referred to herein as "CW input light 126". The first phase modulator 112 modulates the CW input light 126 before the CW input light 126 is coupled into the resonator 150. The CW input light 126 output from the first phase modulator 112 is passed through the first optical circulator 114 to couple into the gyroscope resonator 150 via the first coupler 151. The first coupler 151 couples the CW light 126 of the first laser 106 into the resonator 150 in the CW direction (indicated in FIG. 1). The first optical circulator 114 directs CW input light 126 from the first laser 106 to the first coupler 151 and directs CCW output light 131 from the first coupler 151 to the fourth detector 115.

The second laser 105 generates counter-clockwise (CCW) light 125 for propagation in the CCW direction of the resonator 150. The second laser 105 is also referred to herein as "CCW laser 105". The CCW light 125 is also referred to herein as "CCW input light 125". The second phase modulator 111 modulates the CCW input light 125 before the CCW input light 125 is coupled into the resonator 150. The CCW input light 125 output from the second phase modulator 111 is passed through the second optical circulator 113 to couple into the gyroscope resonator 150 via the second coupler 152. The second coupler 152 couples CCW light 125 of the second laser 105 into the resonator 150 in the CCW direction. The second optical circulator 113 directs CCW input light 125 from the second laser 105 to the second coupler 152 and directs CW output light 130 from the second coupler 152 to the third detector 116.

The first detector 118 is also referred to herein as a CW reflection signal detector 118. The first detector 118 accepts CW output light 128 transmitted from the first coupler 151. The second detector 119 is also referred to herein as a CCW reflection signal detector 119. The second detector 119 accepts CCW output light 129 from the second coupler 152. The third detector 116 is also referred to as a CW transmission signal detector 116. The third detector 119 accepts CW output light 130 from the second coupler 152 via the second optical circulator 113. The fourth detector 115 is also referred to herein as a CCW transmission signal detector 115. The fourth detector 115 accepts CCW output light 131 from the first coupler 151 via the first optical circulator 114.

Figure 2:
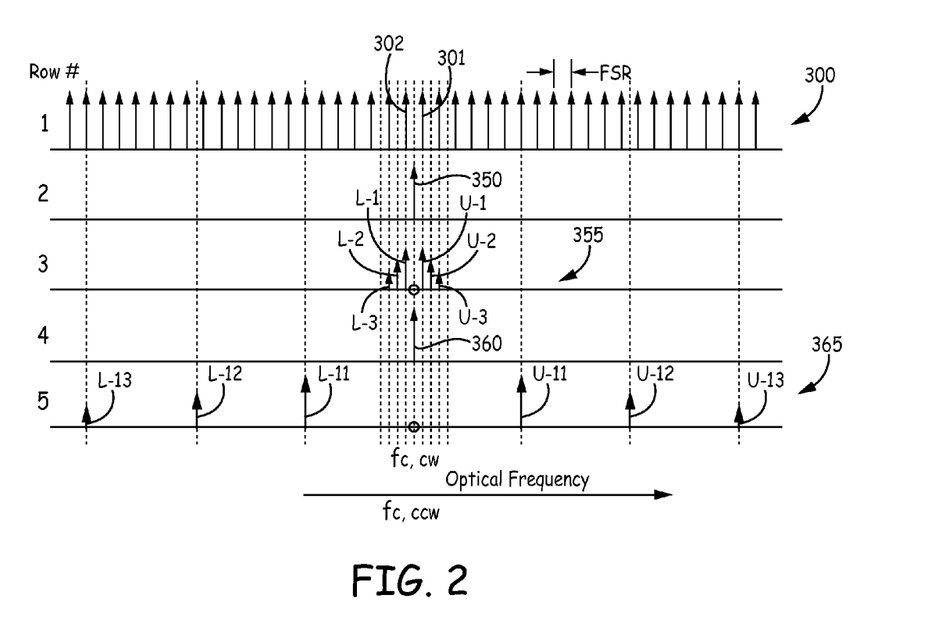
FIGS. 2 and 3 show exemplary frequency relationships among: the FSR modes of the resonator; CW carrier frequency; the CCW carrier frequency; the upper and lower sidebands of the modulated CW carrier frequency; and the upper and lower sidebands of the modulated CCW carrier frequency for two different modulation schemes.
Figure 3:
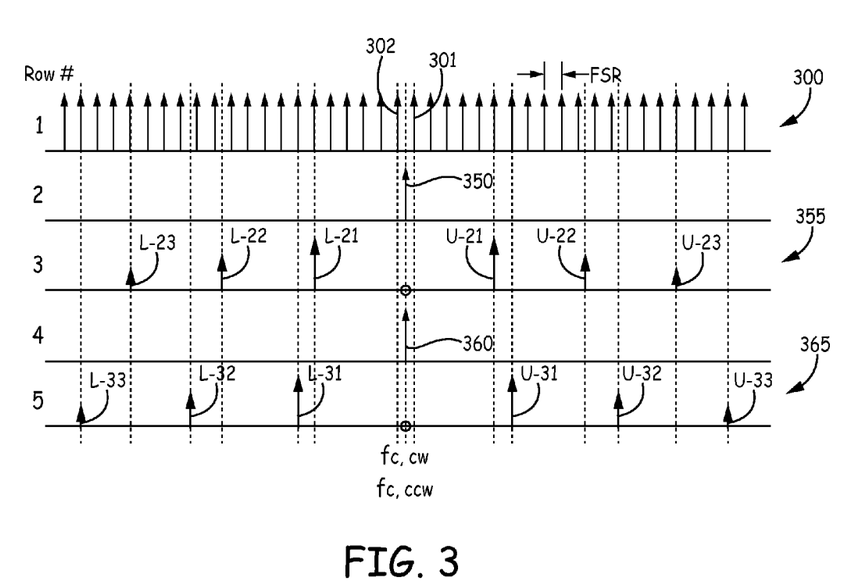

Before the CW input light 126 is coupled into the first coupler 151, the first phase modulator 112 modulates the CW input light 126 with a first modulation frequency of:

$$f_1 = (n+0.5)*\text{FSR}, \qquad \text{Eq. (2)}$$

where n is zero or a positive integer. The first SHD modulation generator 101 is communicatively coupled to the first phase modulator 112 to provide signals 314 to control the amplitude of the phase modulation applied to the CW input light 126. The phase modulation amplitude of the first phase modulator 112 is selected to substantially suppress the optical carrier component $f_{c,cw}$ of the CW light 126 before the CW light 126 is coupled into the resonator 150. The phase modulation of the CW input light 126 generates upper and lower sidebands in addition to suppressing the CW carrier frequency $f_{c,cw}$ as shown in FIGS. 2 and 3.

As known to one skilled in the art, the phase modulation amplitude determines the intensity of the carrier and the sidebands of the modulated output based on the following equation:

$$E(n\omega) = J_n(M) E_0 e^{(in\omega t)} \qquad \text{Eq. (3)}$$

where the electro-magnetic field of the $n^{th}$ harmonics (n=0 for the carrier) is proportion to the Bessel function $J_n(M)$ for a phase modulation amplitude M in unit of radians. In the embodiments of RFOGs described herein, the modulation amplitude is precisely controlled by setting M to select values to substantially suppress the carrier frequency for both the first laser 106 and the second laser 105. For example when M=2.405 or M=5.52, $J_0(M)=0$, and the carrier intensity equals zero and is thus suppressed. Other larger values of M suppress the carrier intensity as is known to one skilled in the art.

Likewise, before the CCW input light 125 is coupled into the second coupler 152, the second phase modulator 111 modulates the second laser light 125 with a second modulation frequency of:

$$f_2 = (m+0.5)*\text{FSR}, \qquad \text{Eq. (4)}$$

where m is zero or a positive integer and is different from n in equation 3. The integers n and m are selected to avoid overlap of major sidebands of CW and CCW light. The second SHD modulation generator 102 is communicatively coupled to the second phase modulator 111 to provide signals 324 to control the amplitude of the phase modulation applied to the CCW input light 125. The phase modulation amplitude of the second phase modulator 111 is selected to substantially suppress the optical carrier component $f_{c,ccw}$ of the CCW input light 125 before the CCW input light 125 is coupled into the resonator 150. This modulation of the CCW input light 125 also generates upper and lower sidebands in addition to suppressing the CCW carrier frequency $f_{c,ccw}$ as shown in FIGS. 2 and 3.

FIGS. 2 and 3 show exemplary frequency relationships among: the resonance modes 300 of the resonator 150; CW carrier frequency $f_{c,ccw}$ 350; the CCW carrier frequency $f_{c,ccw}$ 360; the upper and lower sidebands represented generally at 355 of the modulated CW with carrier frequency $f_{c,cw}$ 350; and the upper and lower sidebands represented generally at 365 of the modulated CCW with carrier frequency $f_{c,ccw}$ 350 for two different modulation schemes. A resonator 150 has many resonance frequencies which are indicated with arrows 300 in the first rows of FIGS. 2 and 3. Neighboring resonance modes 300 are separated by a free spectral range (FSR). The resonance modes 300 are also referred to here as "resonance modes 300".

When CW laser 106 is not modulated, it contains only one frequency component (i.e., the CW carrier frequency $f_{c,cw}$ 350) indicated in the second rows of FIGS. 2 and 3. When CCW laser 105 is not modulated, it contains only one frequency component (i.e. the CCW carrier frequency $f_{c,ccw}$ 360) indicated in the fourth rows of FIGS. 2 and 3. The CW carrier frequency $f_{c,ccw}$ 350 and the CCW carrier frequency $f_{c,ccw}$ 360 are at the same frequency that is midway between two neighboring resonance modes 301 and 302.

When modulation frequency $f_1 = f_{CW} = (n+0.5)\text{FSR}$ is applied to the CW input light 126 and modulation frequency $f_2 = f_{CCW} = (m+0.5)\text{FSR}$ is applied to the CCW input light 125, where n≠m, the generated sidebands 355 of the CW input light 126 (in the third rows of FIGS. 2 and 3) do not overlap with the generated sidebands 365 of the CCW input light 125 (in the fifth rows of FIGS. 2 and 3). In the modulation scheme shown in FIG. 2, n=0 and m=6. In the modulation scheme shown in FIG. 3, n=5 and m=6.

For the exemplary modulation shown in FIG. 2, the SHD modulation is applied to the CW input beam 126 with a modulation frequency $f_{CW}$=(0.5)FSR (i.e., n=0) to create upper sidebands U-1, U-2, and U-3 and lower sidebands L-1, L-2, and L-3 that are frequency shifted from the CW carrier frequency $f_{c,cw}$ by multiples of (0.5)FSR. As shown in the third rows of FIG. 2, the CW carrier frequency $f_{c,cw}$ has been suppressed to zero (or approximately zero) by the amplitude of the applied phase modulation as described above.

For the exemplary modulation shown in FIG. 2, the SHD modulation is applied to the CCW input beam 125 with a modulation frequency $f_{CW}$=(6.5)FSR (i.e., m=6) to create upper sidebands U-11, U-12, and U-13 and lower sidebands L-11, L-12, and L-13 that are frequency shifted from the CCW carrier frequency $f_{c,ccw}$ by multiples of (6.5)FSR. As shown in the fifth rows of FIG. 2, the CCW carrier frequency $f_{c,ccw}$ has been suppressed to zero (or approximately zero) by the amplitude of the applied phase modulation as described above. In this manner, both laser carrier frequencies are locked between the same two resonance modes (e.g., resonance mode 301 and resonance mode 302 shown in FIGS. 2 and 3). The laser carrier frequencies $f_{c,cw}$=$f_{c,ccw}$ are not locked on a resonance of the fiber coil 150 to keep residual carrier power (at $f_{c,cw}$=$f_{c,ccw}$) from reaching the CW transmission signal detector 116 and the CCW transmission signal detector 115.

None of the upper sidebands U-1, U-2, and U-3 and lower sidebands L-1, L-2, and L-3 (third row of FIG. 2) overlap with any of the upper sidebands U-11, U-12, and U-13 and lower sidebands L-11, L-12, and L-13 (fifth row of FIG. 2). In this manner, there is no power in the overlapped carrier frequency components of the CW input light 126 and the CCW input light 125 and there is no interference between CW input light 126 and the CCW input light 125. The upper sidebands U-1, U-2, and U-3 and lower sidebands L-1, L-2, and L-3 are referred to herein as major sidebands of the CW input light 126. The upper sidebands U-11, U-12, and U-13 and lower sidebands L-11, L-32, and L-13 are referred to herein as major sidebands of the CCW input light 125. Many of the sidebands 355 and 365 shown in FIG. 2 pass through the resonator 150 and reach the corresponding detectors (e.g., first detector 118, second detector 119, third detector 116, and fourth detector 115).

The optical power in the sideband components of CW laser 106 decreases quickly as the order of the harmonics increase. At the frequency of the first harmonics (sidebands U-11 and L-11 in the fifth row) of the CCW input light 125, the power in the CW upper sidebands and lower sidebands (third row of FIG. 2) is already reduced to close to zero, leading to negligible interference between the two sidebands. It is to be noted that there is an overlap the $1^{st}$ sidebands of CCW input beam 125 (sidebands U-11 and L-11 in the fifth row) with the $13^{th}$ sideband (not shown) of CW input beam 126. However, the $13^{th}$ sideband of the CW input beam 126 has an amplitude of $1.6 \times 10^{-9}$ (i.e., $J_{13}(2.405)$=1.6×10-9 per equation 3), which is negligible. The high order sidebands, which contain negligible power are not major sidebands of the CW input light and the CCW input light and do not cause performance degradation of the RFOG 10 (FIG. 1) if the carriers (e.g., 350 and 360) are substantially suppressed.

For the exemplary modulation shown in FIG. 3, the SHD modulation is applied to the CW input beam 126 with a modulation frequency $f_{CW}$=(5.5)FSR (i.e., n=5) to create upper sidebands U-21, U-22, and U-23 and lower sidebands L-21, L-22, and L-23 that are frequency shifted from the CW carrier frequency $f_{c,cw}$ by multiples of (5.5)FSR. As shown in the third row of FIG. 3, the CW carrier frequency $f_{c,cw}$ has been suppressed to zero (or approximately zero) by proper selection of the amplitude of the applied phase modulation as described above.

For the exemplary modulation shown in FIG. 3, the SHD modulation is applied to the CCW input beam 125 with a modulation frequency $f_{CW}$=(6.5)FSR (i.e., m=6) to create upper sidebands U-31, U-32, and U-33 and lower sidebands L-31, L-32, and L-33 that are frequency shifted from the CCW carrier frequency $f_{c,ccw}$ by multiples of (6.5)FSR. As shown in the fifth row of FIG. 3, the CCW carrier frequency $f_{c,ccw}$ has been suppressed to zero (or approximately zero) by proper selection of the amplitude of the applied phase modulation as described above.

None of the upper sidebands U-21, U-22, and U-23 and lower sidebands L-21, L-22, and L-23 (third row of FIG. 3) overlap with any of the upper sidebands U-31, U-32, and U-33 and lower sidebands L-31, L-32, and L-33 (fifth row of FIG. 3). In this manner, there is no power in the overlapped carrier frequency components of the CW input light 126 and the CCW input light 125 and there is no interference between CW input light 126 and the CCW input light 125. It is to be noted that each of these upper sidebands U-21, U-22, and U-23 and lower sidebands L-21, L-22, and L-23 (third row of FIG. 3) is offset by at least 1 FSR from each of the upper sidebands U-31, U-32, and U-33 and lower sidebands L-31, L-32, and L-33 (fifth row of FIG. 3). The upper sidebands U-21, U-22, and U-23 and lower sidebands L-21, L-22, and L-23 are referred to herein as major sidebands of the CW input light 126. The upper sidebands U-31, U-32, and U-33 and lower sidebands L-31, L-32, and L-33 are referred to herein as major sidebands of the CCW input light 125. Many of the sidebands 355 and 365 shown in FIG. 3 pass through the resonator 150 and reach the corresponding detectors (e.g., first detector 118, second detector 119, third detector 116, and fourth detector 115).

The CW light 126 and the CCW light 125 are also modulated with a common phase modulation frequency ($f_c$) and amplitude. In one implementation of this embodiment, as shown in FIG. 1, the common phase modulation is generated with a piezo-electric transducer (PZT) 155 upon which the fiber coil 150 is wound and a common modulation signal generator 290 is applied. The common modulation signal generator 290 drives the piezo-electric transducer 155 to periodically increase and decrease the length of the fiber coil 150 so both the CW light 126 and CCW light 125 are commonly modulated while propagating through the fiber coil 150. The length L of the fiber coil 150 is periodically modulated by the PZT 155 responsive to the periodic signals 291 received from the common modulation signal generator 290. As is known to one skilled in the art, the piezo-electric transducer 155 can be a lead zirconate titanate transducer 155 that expands or shrinks under application of voltages. In this manner, a common modulation is applied to the CW light 126 and the CCW light 125 with a common phase modulation frequency ($f_c$) and a common phase amplitude. Other techniques to provide common modulation at a common frequency $f_c$ are possible, one of which is described below with reference to FIG. 4.

In this manner, the CW light 126 and CCW light 125 are each doubly modulated. The first modulation process in the double modulation (provided by the first phase modulator 112 on the CW input light 126 and provided by the second phase modulator 111 on the CCW input light 125) generates modulation frequencies (sidebands) that are different for the CW light 126 and CCW light 125. The second modulation process in the double modulation is the common modulation that shared by both the CW light 126 and the CCW light 125. In this manner, the first laser 106 and the second laser 105 are locked to the same resonance mode, one for clockwise (CW) and the other for counter-clockwise (CCW) directions, with substantial suppression of the carrier power so that they do not interfere with each other.

The first detector 118 sends output (signal 310) to the first servo 251. The first servo 251 is also referred to herein as a "first Pound-Drever-Hall (PDH) servo 251". The second detector 119 sends output (signal 320) to the second servo 252. The second servo 252 is also referred to herein as a "second Pound-Drever-Hall (PDH) servo 252".

The first and second correction servos 261 and 262 use RFOG signals from the respective CW transmission signal detector 116 and the CCW transmission signal detector 115 to correct the bias error in the respective first and second PDH servos 251 and 252. The third detector 116 sends output (signal 316) to the first correction servo 261. The first correction servo 261 provides an adjustment offset signal 317 to the first PDH servo 251. The signal 317 is also referred to herein as "a first adjustment offset signal 317". The fourth detector 115 sends output (signals 326) to the second correction servo 262. The second correction servo 262 provides an adjustment offset signal 327 to the second PDH servo 252. The signal 327 is also referred to herein as "a second adjustment offset signal 327".

The first bias correction servo 261 provides the first adjustment offset signal 317 to the first PDH servo 251 based on a double demodulation of the signal 316 received from the third detector 116. The double demodulation of the signal 316 received from the third detector 116 involves an initial demodulation at $2*f_1$ followed by a demodulation at a common modulation frequency $f_c$. In this manner, the first signal 316 (CW signal) is double demodulated at the first bias correction servo 261 and a first adjustment offset signal 317 is received from the first bias correction servo 261 at the first PDH servo 251.

The second bias correction servo 262 provides the second adjustment offset signal 327 to the second PDH servo 252 based on a double demodulation of the signal 326 received from the fourth detector 115. The double demodulation of the signal 326 received from the fourth detector 115 involves an initial demodulation at $2*f_2$ followed by a demodulation at the common modulation frequency $f_c$. In this manner, the second signal 326 (CCW signals) is double demodulated at the second bias correction servo 262 and a second adjustment offset signal 327 is received from the second bias correction servo 261 at the second PDH servo 252. This double modulation and demodulation process is also referred to herein as Sideband-Heterodyne-Detection (SHD) in an RFOG.

The first PDH servo 251 controls the first laser frequency $f_{c,cw}$ corresponding to demodulation of the signal 310 at frequency $f_1=(n+0.5)*FSR$ received from the first detector 118. Specifically, the first PDH servo 251 controls the first laser frequency $f_{c,cw}$ by sending a signal 315 that causes an adjustment in the frequency $f_{c,cw}$, if needed, of the first laser 106 that corresponds to demodulation of the signal at frequency $f_1=(n+0.5)*FSR$ received from the first detector 118. The second PDH servo 252 controls the second laser frequency $f_{c,ccw}$ corresponding to demodulation of the signal 320 at frequency $f_2=(m+0.5)*FSR$ received from the second detector 119. Specifically, the second PDH servo 252 controls the second laser frequency $f_{c,ccw}$ by sending a signal 325 that causes an adjustment in the frequency $f_{c,ccw}$, if needed, corresponding to demodulation of the signal 320 at frequency $f_2=(m+0.5)*FSR$ received from the second detector 119.

The frequency difference $(f_{c,cw}-f_{c,ccw})$ of the two laser carriers $f_{c,cw}$ and $f_{c,ccw}$ is a direct measure of gyro rotation rates. For example, a processor (not shown) determines the difference in frequency of the signals 315 and 325 to determine the frequency difference of the two laser carrier frequencies $f_{c,cw}$ and $f_{c,ccw}$ upon rotation. In one implementation of this embodiment, the first PDH servo 251 sends information indicative of the rotation rate to another section of the gyroscope system 10. In another implementation of this embodiment, the second PDH servo 252 also sends information indicative of the rotation rate to another section of the gyroscope system 10. In yet another implementation of this embodiment, only the second PDH servo 252 also sends information indicative of the rotation rate to another section of the gyroscope system 10.

Figure 4:
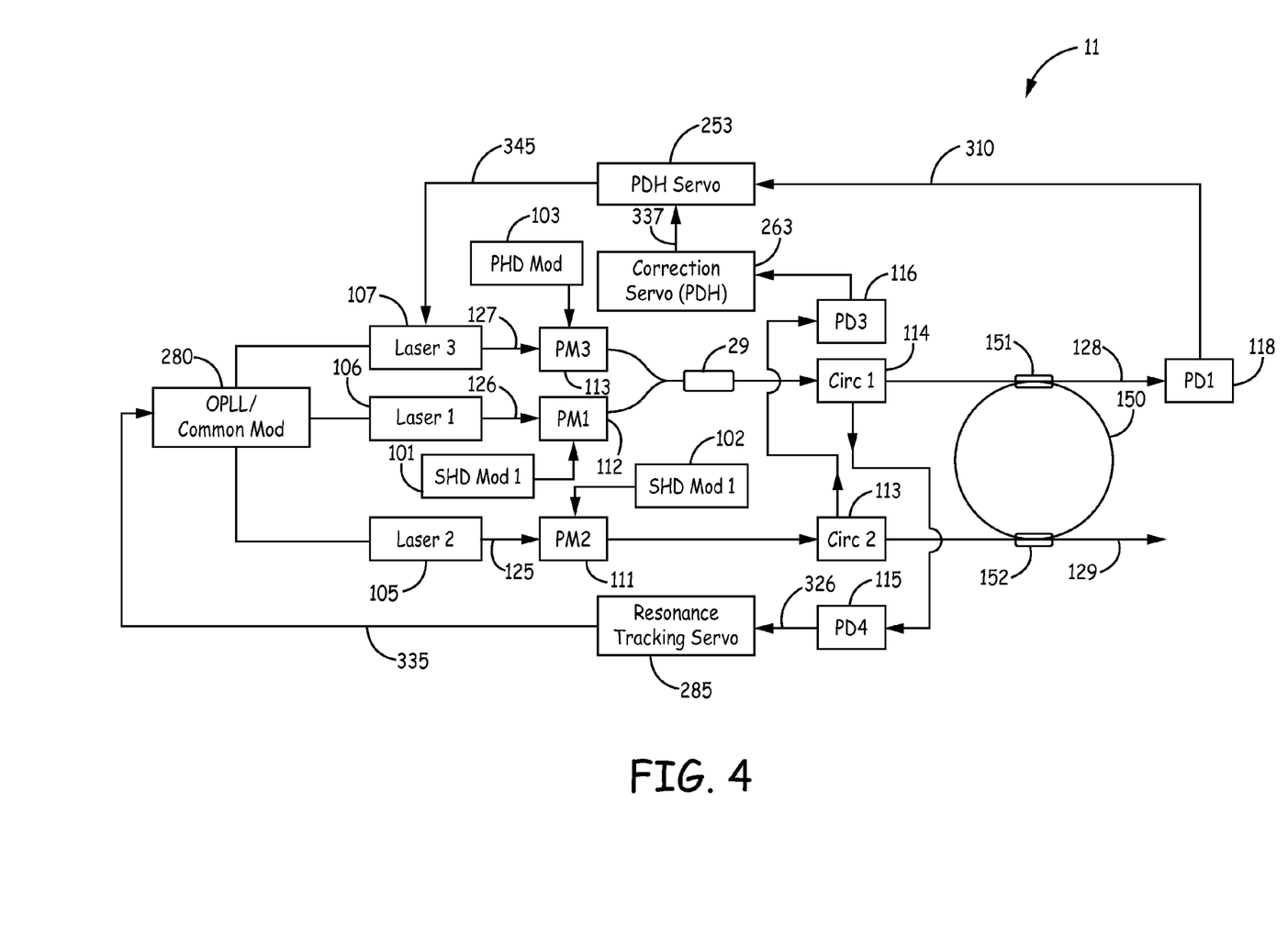
FIG. 4 is a block diagram of an embodiment of a three-laser RFOG architecture to suppress carrier frequencies and implement sideband-heterodyne-detection modulations.

FIG. 4 is a block diagram of an embodiment of a three-laser RFOG architecture to suppress carrier frequencies and implement sideband-heterodyne-detection modulations. The resonator fiber optic gyroscope 11 includes three lasers rather than the two lasers in the RFOG 10 of FIG. 10. The three laser architecture includes an optical phase lock loop (OPLL)/common modulator (mod) 280 that optically phase locks the first laser 106 and the second laser 105 to a third laser 107. The third laser 107 is locked to the fiber coil 150 through PDH servo 253. The RFOG 11 also includes a third phase modulator 113 that modulates the third-laser light 127 at a third modulation frequency $f_3$ before being coupled into the resonator 150 (in either the CW direction or the CCW direction).

As describe above with reference to the RFOG 10 of FIG. 1, the first phase modulation amplitude is set to suppress carrier power of the CW input light 126, the second phase modulation amplitude is set to suppress carrier power of the CCW input light 125. The RFOG 11, the first phase modulation amplitude, the second phase modulation amplitude, and the third phase modulation amplitude are set to suppress carrier power of the input light 127 as described above with reference to FIG. 1.

The RFOG 11 operates as follows. The third laser 107 is locked to the resonator 150 and is locked to the first laser 106 and the second laser 105 through the OPLL/common modulator 280. The OPLL/common modulator 280 determines the frequency offset between the third laser 107 and the first laser 106 and the second laser 105. The common frequency modulation $f_c$ with a common phase amplitude is applied through the OPLL/common modulator 280 so that the frequency difference between the third laser 107 and the first laser 106 and the second laser 105 is modulated. In this manner, the RFOG 11 functions as if the common modulation is applied to the resonator 150. The modulation to the first laser 106 and the second laser 105 is an SHD modulation, while the modulation to the third laser is a PDH modulation. The SHD modulation differs from the PDH modulation in that the PDH servo 253 uses the CW reflection signal detector 118 to lock the third laser 107 to the resonator 150 and no common modulation fc is applied to the third laser 107. The first laser 106 and the second laser 105 are controlled with a double modulations (i.e., SHD and common modulation described above), while the third laser 103 is only controlled by the PDH servo 253 and the PDF modulator 103. Thus, the common modulation in the RFOG 11 is not done by modulation of the fiber coil 150 through a PTZ.

In the exemplary embodiment of FIG. 4, the third-laser light 127 having a third modulation frequency is coupled into the fiber coil 150 in the CW direction along with the CW input light 126. The CW input light 126 and the CW input light 127 are combined at a coupler 29 before being input to the first optical circulator 114. The third phase modulator 113 modulates the CW input light 127 with a third modulation frequency of:

$$f_3=(p+0.5)*FSR \qquad \text{Eq. (5)}$$

where p is zero or a positive integer, is different from n in equation 2, and is different from m in equation (4). The third phase modulation amplitude is set to suppress the carrier power of the input light 127 as described above.

The third laser 107 is optically phase locked to the first laser 106 and the second laser 105 through the OPLL 280, which is also referred to herein as "OPLL/common modulator 280". The first optical circulator 114 directs input light 127 from the third laser 107 and CW input light 126 from the first laser 106 to the first coupler 151. The third phase modulator 113 modulates the third laser 107 at a third modulation frequency $f_3$ before being coupled into the resonator 105 via the first optical circulator 114. The OPLL/common modulator 280 is configured to modulate the relative frequency between the first laser 106, the second laser 105, and the third laser 107. In this manner, the CW light 126 and CCW light 125 are each doubly modulated.

The servo 253 (also referred to herein as a "PDH servo 253") controls the frequency of the third laser 107 based on demodulated signal 310 at the third modulation frequency $f_3$ received from the CW reflection signal detector 118. The Pound-Drever-Hall bias correction servo 263 provides an adjustment offset signal 337 to servo 253 based on based on an initial demodulation at $2*f_1$ followed by a demodulation at the common modulation frequency $f_c$ of the signal received from the CW transmission signal detector 116. The resonance tracking bias correction servo 285 (i.e., resonance tracking servo 285) provides an offset signal 335 to the OPLL/common modulator 280 to adjust the frequency of the second laser 105 based on an initial demodulation at $2*f_2$ followed by a demodulation at the common modulation frequency $f_c$ of the signal 336 received from the CCW transmission signal detector 115.

In another implementation of this embodiment, the third-laser light 127 having a third modulation frequency is coupled into the fiber coil 150 in the CCW direction along with the CCW input light 125. In this alternate embodiment, the CCW input light 125 and the CCW input light 127 would be combined at a coupler before being input to the second optical circulator 113 and the correction servos would be switched as is understandable to one skilled in the art who has read and understood this document.

Figure 5:
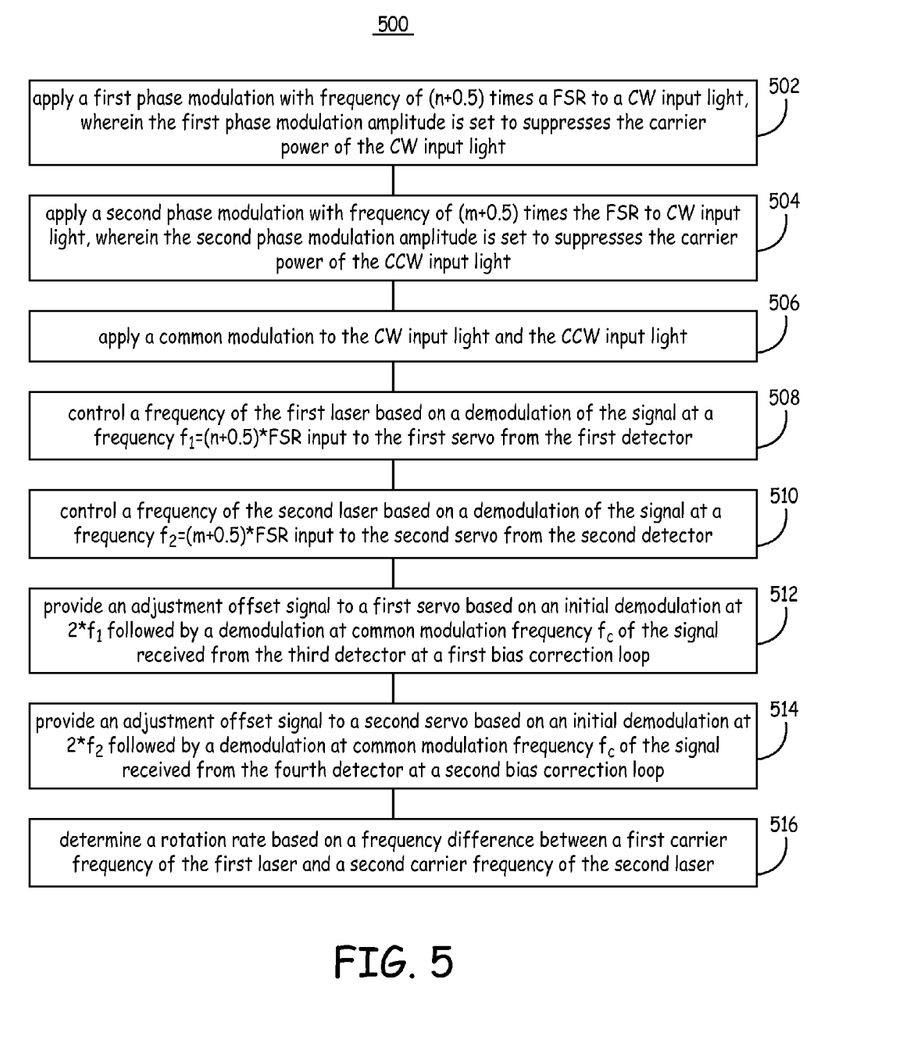
FIG. 5 is a flow diagram of an embodiment of a method to suppress carrier frequencies and implement sideband-heterodyne-detection modulations in a resonator fiber optic gyroscope.

FIG. 5 is a flow diagram of an embodiment of a method 500 to suppress carrier frequencies and implement sideband-heterodyne-detection modulations in a resonator fiber optic gyroscope. The method 500 locks CW input light and CCW input light carrier frequencies between the same two resonance modes of a resonator fiber optic gyroscope so that clockwise (CW) sideband frequency components are offset from counter-clockwise (CCW) sideband frequency components and the carrier power are suppressed. In one implementation of this embodiment, the method of method 500 is implemented with the RFOG 10 shown in FIG. 1. It is to be understood that method 500 can be implemented with other RFOG configurations.

At block 502, a first phase modulation is applied with frequency of (n+0.5) times a free spectral range (FSR) to a CW input light, where n is zero or a positive integer. The first phase modulation amplitude is set to suppress the carrier power of the CW input light as described above with reference to FIG. 1.

At block 504, a second phase modulation with frequency of (m+0.5) times the FSR is applied to CCW input light, where m is zero or a positive integer and is different from n. The second phase modulation amplitude is set to suppress the carrier power of the CCW input light as described above with reference to FIG. 1.

The CW input light modulated with the first phase modulation is coupled into the fiber coil in the CW direction at a first coupler. The CCW input light modulated with the second phase modulation is coupled into the fiber coil in the CCW direction at a second coupler.

At block 506, a common modulation is applied to the CW input light and the CCW input light. In one implementation of this embodiment, a common periodic modulation signal is provided to a piezo-electric transducer from a common modulation signal generator. In another implementation of this embodiment, a third laser is used with an OPLL/common modulator to provide the common modulation as described above with reference to FIG. 4.

The CW output light from the first coupler is received at a first detector. The CCW output light from the second coupler is received at a second detector. The CW output light from the second coupler is received at a third detector. The CCW output light from the first coupler is received a fourth detector.

CW input light from the first laser is directed to the first coupler at a first optical circulator. CCW output light from the first coupler is directed to the fourth detector at the first optical circulator. CCW input light from the second laser is directed to the second coupler at a second optical circulator. CW output light from the second coupler is directed to the third detector at the second optical circulator.

At block 508, a frequency of the first laser is controlled based on a demodulation of the signal at a frequency $f_1=(n+0.5)*FSR$ input to the first servo from the first detector. At block 510, a frequency of the second laser is controlled based on a demodulation of the signal at a frequency $f_2=(m+0.5)*FSR$ input to the second servo from the second detector.

At block 512, an adjustment offset signal is provided to a first servo based on an initial demodulation at $2*f_1$ followed by a demodulation at a common modulation frequency $f_c$ of the signal received from the third detector at a first bias correction servo.

At block 514, an adjustment offset signal is provided to a second servo based on an initial demodulation at $2*f_2$ followed by a demodulation at the common modulation frequency $f_c$ of the signal received from the fourth detector at a second bias correction servo.

At block 516, a rotation rate is determined based on a frequency difference between a first carrier frequency of the first laser and a second carrier frequency of the second laser as is understood by one skilled in the art.

Example Embodiments

Example 1 includes a resonator fiber optic gyroscope (RFOG), comprising: a fiber coil that forms a resonator; a first laser that generates clockwise (CW) input light for propagation in the CW direction of the fiber coil; a second laser that generates counter-clockwise (CCW) input light for propagation in the CCW direction of the fiber coil; a first phase modulator to modulate the CW input light with a first modulation frequency of $f_1=(n+0.5)*FSR$ before being coupled into the fiber coil in the CW direction, where n is zero or a positive integer, wherein the phase modulation amplitude of the first modulator is selected to substantially suppress the optical carrier component of the CW input light before being coupled into the fiber coil; a second phase modulator to modulate the CCW input light with a second modulation frequency of f2=(m+0.5)*FSR before being coupled into the fiber coil in the CCW direction, where m is zero or a positive integer and is different from n, wherein n and m are selected to avoid overlap of major sidebands of the CW input light and the CCW input light, wherein the phase modulation amplitude of the second modulator is selected to substantially suppress the optical carrier component of the CCW input light before being coupled into the fiber coil; and a common phase modulator configured to modulate the CW input light and the CCW input light with a common phase modulation frequency and a common phase amplitude.

Example 2 includes the resonator fiber optic gyroscope of Example 1, further comprising: a first sideband-heterodyne-detection modulator communicatively coupled to the first phase modulator to provide signals to control the amplitude of the phase modulation applied to the CW input light; and a second sideband-heterodyne-detection modulator communicatively coupled to the second phase modulator to provide signals to control the amplitude of the phase modulation applied to the CCW input light.

Example 3 includes the resonator fiber optic gyroscope of Example 2, further comprising: a first coupler that couples the CW input light into the fiber coil in the CW direction; and a second coupler that couples CCW input light into the fiber coil in the CCW direction.

Example 4 includes the resonator fiber optic gyroscope of Example 3, further comprising: a first detector for receiving CW output light from the first coupler; a second detector for receiving CCW output light from the second coupler; a third detector for receiving CW output light from the second coupler; a fourth detector for receiving CCW output light from the first coupler.

Example 5 includes the resonator fiber optic gyroscope of Example 4, further comprising: a first optical circulator that directs CW input light from the first laser to the first coupler, and directs CCW output light from the first coupler to the fourth detector; and a second optical circulator that directs CCW input light from the second laser to the second coupler, and directs CW output light from the second coupler to the third detector.

Example 6 includes the resonator fiber optic gyroscope of any of Examples 4-5, further comprising: a first servo configured to control a frequency of the first laser based on a demodulation of a signal at a frequency $f_1=(n+0.5)*FSR$ input to the first servo from the first detector; and a second servo configured to control a frequency of the second laser based on a demodulation of a signal at a frequency $f2=(m+0.5)*FSR$ input to the second servo from the second detector.

Example 7 includes the resonator fiber optic gyroscope of Example 6, further comprising: a first bias correction servo that provides an adjustment offset signal to the first PDH servo based on an initial demodulation at $2*f_1$ followed by a demodulation at a common modulation frequency of a signal received from the third detector; and a second bias correction servo that provides an adjustment offset signal to the second PDH servo based on an initial demodulation at $2*f_2$ followed by a demodulation at the common modulation frequency of the signal received from the fourth detector.

Example 8 includes the resonator fiber optic gyroscope of Example 7, wherein the common phase modulator comprises: a piezo-electric transducer (PZT) upon which the fiber coil is wound; and a common modulation signal generator configured to provide periodic modulation signals to the piezo-electric transducer wherein the length of the fiber coil is periodically increased and decreased responsive to the periodic signals.

Example 9 includes the resonator fiber optic gyroscope of any of Examples 4-8, further comprising: a third laser that generates light for propagation in the fiber coil, wherein the first coupler couples light from the third laser to the fiber coil; a third phase modulator to modulate the third-laser light generated by the third laser with a third modulation frequency f3 of (p+0.5) times the FSR, where p is zero or a positive integer, is different from n, and is different from m, wherein n, m, and p are selected to avoid overlap of major sidebands of the CW input light and the CCW input light, wherein the second phase modulation amplitude is set to suppresses the carrier power of the third-laser light before being coupled into the fiber coil, wherein the phase modulation amplitude of the third modulator is selected to substantially suppress the optical carrier component of the third-laser light before being coupled into the fiber coil; and an optical phase lock loop/common modulator configured to optically phase lock the first laser and second laser to the third laser and to modulate the relative frequency between the first laser, the second laser, and the third laser.

Example 10 includes the resonator fiber optic gyroscope of Example 9, further comprising: a Pound-Hall-Drever servo to control a frequency of the third laser based on a demodulation of a signal at a frequency f3=(p+0.5)*FSR input to the Pound-Hall-Drever servo from the first detector; a Pound-Hall-Drever bias correction servo that provides an adjustment offset signal to the Pound-Hall-Drever servo based on an initial demodulation at $2*f_1$ followed by a demodulation at a common modulation frequency of a signal received from the third detector; and a resonance tracking bias correction servo that provides an offset signal to the optical phase lock loop to adjust the frequency of the second laser based on an initial demodulation at 2*f2 followed by a demodulation at the common modulation frequency of the signal received from the fourth detector.

Example 11 includes a method to lock a clockwise (CW) input light and a counter-clockwise (CCW) input light to suppress carrier frequencies and implement sideband-heterodyne-detection modulations in a resonator fiber optic gyroscope, the method comprising: applying a first phase modulation with frequency of (n+0.5) times a free spectral range (FSR) to a CW input light, where n is zero or a positive integer, wherein the first phase modulation amplitude is set to suppresses the carrier power of the CW input light; applying a second phase modulation with frequency of (m+0.5) times the FSR to CCW input light, where m is zero or a positive integer and is different from n, wherein the second phase modulation amplitude is set to suppresses the carrier power of the CCW input light, and wherein n and m are selected to avoid overlap of major sidebands of the CW input light and the CCW input light; and applying a common modulation to the CW input light and the CCW input light.

Example 12 includes the method of 11, further comprising: coupling the CW input light modulated with the first phase modulation into a fiber coil in the CW direction at a first coupler; and coupling the CCW input light modulated with the second phase modulation into the fiber coil in the CCW direction at a second coupler; wherein applying the common modulation to the CW input light and the CCW input light comprises: providing a common periodic modulation signal to a piezo-electric transducer from a common modulation signal generator.

Example 13 includes the method of Example 12, further comprising: receiving CW output light from the first coupler a first detector; receiving CCW output light from the second coupler at a second detector; receiving CW output light from the second coupler at a third detector; and receiving CCW output light from the first coupler a fourth detector.

Example 14 includes the method of Example 13, further comprising: directing CW input light from the first laser to the first coupler at a first optical circulator; directing CCW output light from the first coupler to the fourth detector at the first optical circulator; directing CCW input light from the second laser to the second coupler at a second optical circulator; and directing CW output light from the second coupler to the third detector at the second optical circulator.

Example 15 includes the method of any of Examples 13-14, further comprising: controlling a frequency of the first laser based on a demodulation of the signal at a frequency $f_1=(n+0.5)*FSR$ input to the first servo from the first detector; and controlling a frequency of the second laser based on a demodulation of the signal at a frequency $f2=(m+0.5)*FSR$ input to the second servo from the second detector.

Example 16 includes the method of Example 15, further comprising: providing an adjustment offset signal to a first servo based on an initial demodulation at $2*f_1$ followed by a demodulation at a common modulation frequency of the signal received from the third detector at a first bias correction servo; and providing an adjustment offset signal to a second servo based on an initial demodulation at $2*f2$ followed by a demodulation at the common modulation frequency of the signal received from the fourth detector at a second bias correction servo.

Example 17 includes the method of any of Examples 11-16, further comprising: applying a third phase modulation with frequency of (p+0.5) times a free spectral range (FSR) to a third input light generated by a third laser, where n is zero or a positive integer, wherein the first phase modulation amplitude is set to suppresses the carrier power of the CW input light; optically phase locking the third laser to the first laser and to the second laser through an optical phase lock loop/common modulator; modulating the relative frequency between the first laser, the second laser, and the third laser at the optical phase lock loop/common modulator; controlling the frequency of the third laser based on demodulated signal at the third modulation frequency at a Pound-Hall-Drever servo; providing an adjustment offset signal to a Pound-Hall-Drever servo from a Pound-Hall-Drever bias correction servo, the adjustment signal being based on based on an initial demodulation at $2*f_1$ followed by a demodulation at a common modulation frequency of a signal received from a third detector; and providing an offset signal to the optical phase lock loop from a resonance tracking bias correction servo to adjust the frequency of the second laser based on an initial demodulation at $2*f_2$ followed by a demodulation at the common modulation frequency of the signal received from the fourth detector.

Example 18 includes the method of 11, further comprising: determining a rotation rate based on a frequency difference between a first carrier frequency of the first laser and a second carrier frequency of the second laser.

Example 19 includes a system for detecting a rotation rate of a gyroscope comprising: means for applying a first phase modulation to clockwise (CW) input light with a first phase modulation amplitude set to suppresses carrier power of the CW input light and with a first frequency of (n+0.5) times a free spectral range (FSR), where n is zero or a positive integer; means for applying a second phase modulation to counter-clockwise (CCW) input light with a second phase modulation amplitude set to suppresses carrier power of the CCW input light and with a second frequency of (m+0.5) times the FSR, where m is zero or a positive integer and is different from n, and where the values of m and n are selected to avoid overlap of major sidebands of the CW input light and the CCW input light; means for applying a common modulation to the CW input light and the CCW input light; means for double demodulating first signals; means for double demodulating second signals; and means for determining the rotation rate based on a frequency difference between a first carrier frequency and a second carrier frequency.

Example 20 includes the system of Example 19, further comprising; means for receiving a first adjustment offset signal from the means for double demodulating the first signals; and means for receiving a second adjustment offset signal from the means for double demodulating the second signals.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonator fiber optic gyroscope (RFOG), comprising:
   a fiber coil that forms a resonator;
   a first laser that generates clockwise (CW) input light for propagation in the CW direction of the fiber coil;
   a second laser that generates counter-clockwise (CCW) input light for propagation in the CCW direction of the fiber coil;
   a first phase modulator to modulate the CW input light with a first modulation frequency of $f_1=(n+0.5)*FSR$ before being coupled into the fiber coil in the CW direction, where n is zero or a positive integer, wherein the phase modulation amplitude of the first modulator is selected to substantially suppress the optical carrier component of the CW input light before being coupled into the fiber coil;
   a second phase modulator to modulate the CCW input light with a second modulation frequency of $f_2=(m+0.5)*FSR$ before being coupled into the fiber coil in the CCW direction, where m is zero or a positive integer and is different from n, wherein n and m are selected to avoid overlap of major sidebands of the CW input light and the CCW input light, wherein the phase modulation amplitude of the second modulator is selected to substantially suppress the optical carrier component of the CCW input light before being coupled into the fiber coil; and
   a common phase modulator configured to modulate the CW input light and the CCW input light with a common phase modulation frequency and a common phase amplitude.

2. The resonator fiber optic gyroscope of claim 1, further comprising:
   a first sideband-heterodyne-detection modulator communicatively coupled to the first phase modulator to provide signals to control the amplitude of the phase modulation applied to the CW input light; and
   a second sideband-heterodyne-detection modulator communicatively coupled to the second phase modulator to provide signals to control the amplitude of the phase modulation applied to the CCW input light.

3. The resonator fiber optic gyroscope of claim 2, further comprising:
   a first coupler that couples the CW input light into the fiber coil in the CW direction; and
   a second coupler that couples CCW input light into the fiber coil in the CCW direction.

4. The resonator fiber optic gyroscope of claim 3, further comprising:
a first detector for receiving CW output light from the first coupler;
a second detector for receiving CCW output light from the second coupler;
a third detector for receiving CW output light from the second coupler;
a fourth detector for receiving CCW output light from the first coupler.

5. The resonator fiber optic gyroscope of claim 4, further comprising:
a first optical circulator that directs CW input light from the first laser to the first coupler, and directs CCW output light from the first coupler to the fourth detector; and
a second optical circulator that directs CCW input light from the second laser to the second coupler, and directs CW output light from the second coupler to the third detector.

6. The resonator fiber optic gyroscope of claim 4, further comprising:
a first servo configured to control a frequency of the first laser based on a demodulation of a signal at a frequency $f_1=(n+0.5)*FSR$ input to the first servo from the first detector; and
a second servo configured to control a frequency of the second laser based on a demodulation of a signal at a frequency $f_2=(m+0.5)*FSR$ input to the second servo from the second detector.

7. The resonator fiber optic gyroscope of claim 6, further comprising:
a first bias correction servo that provides an adjustment offset signal to the first PDH servo based on an initial demodulation at $2*f_1$ followed by a demodulation at a common modulation frequency of a signal received from the third detector; and
a second bias correction servo that provides an adjustment offset signal to the second PDH servo based on an initial demodulation at $2*f_2$ followed by a demodulation at the common modulation frequency of the signal received from the fourth detector.

8. The resonator fiber optic gyroscope of claim 7, wherein the common phase modulator comprises:
a piezo-electric transducer (PZT) upon which the fiber coil is wound; and
a common modulation signal generator configured to provide periodic modulation signals to the piezo-electric transducer wherein the length of the fiber coil is periodically increased and decreased responsive to the periodic signals.

9. The resonator fiber optic gyroscope of claim 4, further comprising:
a third laser that generates light for propagation in the fiber coil, wherein the first coupler couples light from the third laser to the fiber coil;
a third phase modulator to modulate the third-laser light generated by the third laser with a third modulation frequency $f_3$ of $(p+0.5)$ times the FSR, where p is zero or a positive integer, is different from n, and is different from m, wherein n, m, and p are selected to avoid overlap of major sidebands of the CW input light and the CCW input light, wherein the second phase modulation amplitude is set to suppresses the carrier power of the third-laser light before being coupled into the fiber coil, wherein the phase modulation amplitude of the third modulator is selected to substantially suppress the optical carrier component of the third-laser light before being coupled into the fiber coil; and
an optical phase lock loop/common modulator configured to optically phase lock the first laser and second laser to the third laser and to modulate the relative frequency between the first laser, the second laser, and the third laser.

10. The resonator fiber optic gyroscope of claim 9, further comprising:
a Pound-Hall-Drever servo to control a frequency of the third laser based on a demodulation of a signal at a frequency $f_3=(p+0.5)*FSR$ input to the Pound-Hall-Drever servo from the first detector;
a Pound-Hall-Drever bias correction servo that provides an adjustment offset signal to the Pound-Hall-Drever servo based on an initial demodulation at $2*f_1$ followed by a demodulation at a common modulation frequency of a signal received from the third detector; and
a resonance tracking bias correction servo that provides an offset signal to the optical phase lock loop to adjust the frequency of the second laser based on an initial demodulation at $2*f_2$ followed by a demodulation at the common modulation frequency of the signal received from the fourth detector.

11. A method to lock a clockwise (CW) input light and a counter-clockwise (CCW) input light to suppress carrier frequencies and implement sideband-heterodyne-detection modulations in a resonator fiber optic gyroscope, the method comprising:
applying a first phase modulation with frequency of $(n+0.5)$ times a free spectral range (FSR) to a CW input light, where n is zero or a positive integer, wherein the first phase modulation amplitude is set to suppresses the carrier power of the CW input light;
applying a second phase modulation with frequency of $(m+0.5)$ times the FSR to CCW input light, where m is zero or a positive integer and is different from n, wherein the second phase modulation amplitude is set to suppresses the carrier power of the CCW input light, and wherein n and m are selected to avoid overlap of major sidebands of the CW input light and the CCW input light; and
applying a common modulation to the CW input light and the CCW input light.

12. The method of 11, further comprising:
coupling the CW input light modulated with the first phase modulation into a fiber coil in the CW direction at a first coupler; and
coupling the CCW input light modulated with the second phase modulation into the fiber coil in the CCW direction at a second coupler;
wherein applying the common modulation to the CW input light and the CCW input light comprises:
providing a common periodic modulation signal to a piezo-electric transducer from a common modulation signal generator.

13. The method of claim 12, further comprising:
receiving CW output light from the first coupler a first detector;
receiving CCW output light from the second coupler at a second detector;
receiving CW output light from the second coupler at a third detector; and
receiving CCW output light from the first coupler a fourth detector.

14. The method of claim 13, further comprising:
directing CW input light from the first laser to the first coupler at a first optical circulator;
directing CCW output light from the first coupler to the fourth detector at the first optical circulator;
directing CCW input light from the second laser to the second coupler at a second optical circulator; and
directing CW output light from the second coupler to the third detector at the second optical circulator.

15. The method of claim 13, further comprising:
controlling a frequency of the first laser based on a demodulation of the signal at a frequency $f_1=(n+0.5)$*FSR input to the first servo from the first detector; and
controlling a frequency of the second laser based on a demodulation of the signal at a frequency $f_2=(m+0.5)$*FSR input to the second servo from the second detector.

16. The method of claim 15, further comprising:
providing an adjustment offset signal to a first servo based on an initial demodulation at $2*f_1$ followed by a demodulation at a common modulation frequency of the signal received from the third detector at a first bias correction servo; and
providing an adjustment offset signal to a second servo based on an initial demodulation at $2*f_2$ followed by a demodulation at the common modulation frequency of the signal received from the fourth detector at a second bias correction servo.

17. The method of claim 11, further comprising:
applying a third phase modulation with frequency of $(p+0.5)$ times a free spectral range (FSR) to a third input light generated by a third laser, where n is zero or a positive integer, wherein the first phase modulation amplitude is set to suppresses the carrier power of the CW input light;
optically phase locking the third laser to the first laser and to the second laser through an optical phase lock loop/common modulator;
modulating the relative frequency between the first laser, the second laser, and the third laser at the optical phase lock loop/common modulator;
controlling the frequency of the third laser based on demodulated signal at the third modulation frequency at a Pound-Hall-Drever servo;
providing an adjustment offset signal to a Pound-Hall-Drever servo from a Pound-Hall-Drever bias correction servo, the adjustment signal being based on an initial demodulation at $2*f_1$ followed by a demodulation at a common modulation frequency of a signal received from a third detector; and
providing an offset signal to the optical phase lock loop from a resonance tracking bias correction servo to adjust the frequency of the second laser based on an initial demodulation at $2*f_2$ followed by a demodulation at the common modulation frequency of the signal received from the fourth detector.

18. The method of 11, further comprising:
determining a rotation rate based on a frequency difference between a first carrier frequency of the first laser and a second carrier frequency of the second laser.

19. A system for detecting a rotation rate of a gyroscope comprising:
means for applying a first phase modulation to clockwise (CW) input light with a first phase modulation amplitude set to suppresses carrier power of the CW input light and with a first frequency of $(n+0.5)$ times a free spectral range (FSR), where n is zero or a positive integer;
means for applying a second phase modulation to counterclockwise (CCW) input light with a second phase modulation amplitude set to suppresses carrier power of the CCW input light and with a second frequency of $(m+0.5)$ times the FSR, where m is zero or a positive integer and is different from n, and where the values of m and n are selected to avoid overlap of major sidebands of the CW input light and the CCW input light;
means for applying a common modulation to the CW input light and the CCW input light;
means for double demodulating first signals;
means for double demodulating second signals; and
means for determining the rotation rate based on a frequency difference between a first carrier frequency and a second carrier frequency.

20. The system of claim 19, further comprising;
means for receiving a first adjustment offset signal from the means for double demodulating the first signals; and
means for receiving a second adjustment offset signal from the means for double demodulating the second signals.

* * * * *